(12) United States Patent
Caprioli et al.

(10) Patent No.: US 7,478,203 B2
(45) Date of Patent: Jan. 13, 2009

(54) TECHNIQUE FOR ELIMINATING DEAD STORES IN A PROCESSOR

(75) Inventors: Paul Caprioli, Mountain View, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 316 days.

(21) Appl. No.: 11/371,144

(22) Filed: Mar. 8, 2006

(65) Prior Publication Data

US 2007/0226425 A1 Sep. 27, 2007

(51) Int. Cl.
*G06F 12/00* (2006.01)
(52) U.S. Cl. .................. 711/144; 711/119; 711/143
(58) Field of Classification Search .............. 711/143, 711/144
See application file for complete search history.

(56) References Cited

U.S. PATENT DOCUMENTS

| 5,233,616 A | * | 8/1993 | Callander .............. 714/758 |
| 5,353,410 A | * | 10/1994 | Macon et al. ............ 711/144 |
| 5,467,460 A | * | 11/1995 | Patel .................. 711/143 |
| 5,555,398 A | * | 9/1996 | Raman ................ 711/143 |
| 5,860,105 A | * | 1/1999 | McDermott et al. ........ 711/135 |
| 5,912,906 A | | 6/1999 | Wu et al. |
| 5,953,742 A | | 9/1999 | Williams |
| 6,134,634 A | * | 10/2000 | Marshall et al. .......... 711/143 |
| 6,434,683 B1 | * | 8/2002 | West et al. ............. 711/162 |
| 6,584,595 B2 | | 6/2003 | Cypher |
| 6,678,799 B2 | * | 1/2004 | Ang .................. 711/141 |
| 6,766,431 B1 | * | 7/2004 | Moyer ................ 711/168 |
| 6,785,763 B2 | | 8/2004 | Garnett et al. |
| 6,785,777 B2 | | 8/2004 | Garnett et al. |
| 6,938,130 B2 | | 8/2005 | Jacobson et al. |
| 6,950,907 B2 | | 9/2005 | Garnett et al. |
| 2004/0153609 A1 | * | 8/2004 | Melamed et al. ......... 711/141 |
| 2006/0184745 A1 | * | 8/2006 | Tan .................. 711/143 |

* cited by examiner

*Primary Examiner*—Pierre-Michel Bataille
*Assistant Examiner*—Hetul Patel
(74) *Attorney, Agent, or Firm*—Gunnison, McKay & Hodgson, L.L.P.; Forrest Gunnison

(57) ABSTRACT

A technique for reducing off-chip bandwidth requirements for a processor reads old data from a location in an on-chip store of a processor in preparation of writing new data to the location in the on-chip store. The technique determines whether new data bytes of the new data and associated old data bytes of the old data are different. The new data bytes are then written to the on-chip store. When updating an off-chip store, only the new data bytes that are different are written to the off-chip store. In this manner, off-chip bandwidth requirements for a processor may be reduced.

14 Claims, 5 Drawing Sheets

TECHNIQUE FOR ELIMINATING DEAD STORES IN A PROCESSOR

BACKGROUND

1. Field of the Invention

The present invention is generally directed toward a processor and, more specifically, to a method for reducing off-chip bandwidth requirements for a processor.

2. Description of the Related Art

Memory systems within a computer system have typically implemented multiple levels of cache memory or cache, e.g., a level 1 (L1) cache, a level 2 (L2) cache and a level 3 (L3) cache, in addition to main memory. Usually, one or more cache memory levels are implemented on-chip within a processor. In a typical case, both reads from main memory and writes to main memory are cached. To reduce the overhead of information transfer between cache and main memory, information has usually been transferred in a group, e.g., a cache line or multiple cache lines. A cache line size is architecturally dependent and usually expressed in bytes, e.g., a cache line may be between 32 and 128 bytes. Cache memories usually implement one of two write policies, i.e., a write-back policy or a write-through policy. In caches that implement a write-back policy, newly cached information is not actually written to main memory until a cache line that stores the information is needed for a new address. The cache memory may implement any number of different cache replacement policies, e.g., a least recently used (LRU) policy, when deciding which cache line(s) to boot from the cache. In a memory system implementing write-through cache, every time the processor writes to a cache location, the corresponding main memory location is also updated.

Usually, write-back cache provides better performance at a slightly higher risk of memory system integrity. That is, write-back cache may save a memory system from performing many unnecessary write cycles to main memory, which can lead to measurable processor execution improvements. However, when write-back cache is implemented, writes to cache locations are only placed in cache and the main memory is not actually updated until the cache line is booted out of the cache to make room for another address in the cache. As a result, at any given time there can be a mismatch of information between one or more cache lines and corresponding addresses in main memory. When this occurs, the main memory is said to be stale, as the main memory does not contain the new information that has only been written to the cache. On the other hand, in memory systems that implement write-through cache, the main memory is never stale as the main memory is written at substantially the same time that the cache is written.

Normally, stale memory is not a problem as a cache controller, implemented in conjunction with the cache, keeps track of which locations in the cache have been changed and, therefore, which locations in main memory may be stale. This has typically been accomplished by implementing an extra bit of memory, usually one per bit cache line, called a "dirty bit". Whenever a write is cached, the "dirty bit" is set to provide an indication to the cache controller that when the cache line is reused for a different address, the information needs to be written to the corresponding address in main memory. In a typical memory system, the "dirty bit" has been implemented by adding an extra bit to a tag random access memory (RAM), as opposed to adding a dedicated separate memory. In various computer systems, it may be desirable for a cache controller to read old information from a cache line before storing new information to the cache line. For example, reading the old information before storing the new information may be done to detect errors using an error correction code (ECC) with an error correcting circuit and to update the ECC to take into account bits that change as a result of the new information.

As processor designs become increasingly advanced, management of limited off-chip processor bandwidth has become increasingly important. Limited off-chip processor bandwidth can be even more problematic in chip multiprocessor (CMP) designs. As is well known, a CMP is essentially a symmetric multi-processor (SMP) implemented on a single integrated circuit. In a typical case, multiple processor cores of the CMP share main memory, of a memory hierarchy, and various interconnects. In general, a computer system that implements one or more CMPs allows for increased thread-level parallelism (TLP). Unfortunately, limited off-chip bandwidth is increasingly difficult to manage in chip multi-processor (CMP) designs and/or other designs that are aggressive speculative architectures. As has been noted by various academic researchers, writes from cache to off-chip memory, e.g., main memory, frequently write information that is identical to that already stored in the off-chip memory. Thus, when a cache line is booted from cache that contains information that is identical to the information already stored in off-chip memory, limited off-chip bandwidth is needlessly consumed.

What is needed is a technique for reducing the use of limited off-chip bandwidth for transferring redundant information.

SUMMARY

The present invention is generally directed to a technique for reducing off-chip bandwidth requirements for a processor. According to various aspects of the present invention, old data is read from a location in an on-chip store of a processor in preparation of writing new data to the location in the on-chip store. The technique determines whether new data blocks of the new data and associated old data blocks of the old data are different. The new data blocks are then written to the on-chip store. When updating an off-chip store, only the new data blocks that are different are written to the off-chip store. Thus, off-chip bandwidth requirements for a processor may be reduced.

According to another aspect of the present invention, the reading old data from a location in an on-chip chip store of a processor further comprises detecting errors in the old data with an error correction code (ECC) and an error correcting circuit and updating the ECC to account for changed data bits attributable to the new data. The on-chip store may be one of a level 1 (L1) or a level 2 (L2) cache. The data blocks may each correspond to a cache line of 64 bytes. The data blocks may also correspond to a portion of a cache line. For example, the portion of the cache line may be a byte in the cache line. According to another aspect of the present invention, the new data blocks are marked with a non-traditional "dirty bit" when one or more bits in a corresponding one of the old data blocks has changed. The non-traditional "dirty bit" provides an indication that the marked new data blocks need to be written from the cache to the main memory, when the cache line is booted from the cache.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention is generally directed to a technique for reducing off-chip bandwidth requirements for a processor. According to the present invention, old data is read from a location in an on-chip store, e.g., a level 2 (L2) cache, of a processor in preparation of writing new data to the location in the on-chip store. The old data is read so that errors in the old data may be detected with an error correction code (ECC) and an error correcting circuit and the ECC can be updated, if required, to account for changed data bits attributable to the new data. The technique determines whether new data blocks of the new data and associated old data blocks of the old data are different. The new data blocks are then written to the on-chip store. When updating an off-chip store, only the new data blocks that are different are written to the off-chip store. Thus, off-chip bandwidth requirements for a processor may be reduced.

The data blocks may each correspond to a cache line, e.g., a cache line of 64 bytes, or may correspond to a portion of a cache line. For example, the portion of the cache line may be a byte in the cache line. According to another aspect of the present invention, the new data blocks are marked with a non-traditional "dirty bit" when one or more bits in a corresponding one of the old data blocks has changed. The non-traditional "dirty bit" provides an indication that only marked new data blocks need be written from the cache to the off-chip store, e.g., main memory, when the cache line is booted from the cache.

Figure 1:
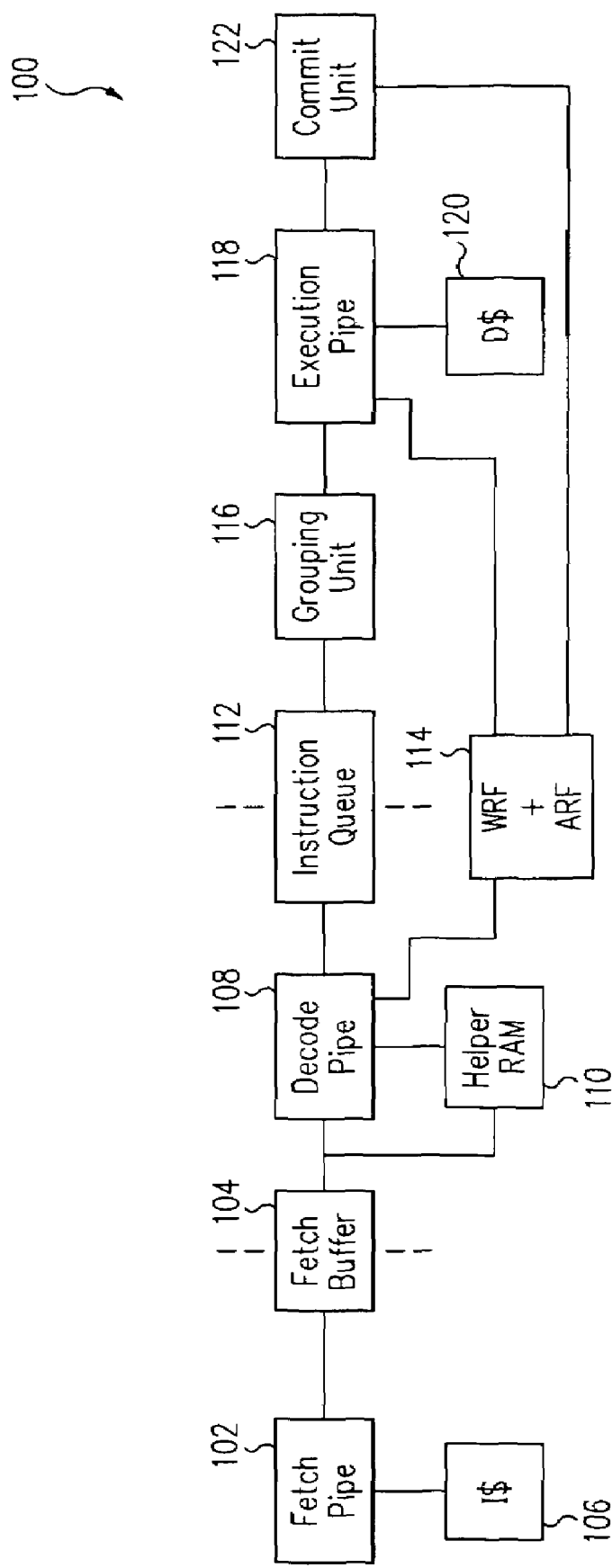
FIG. 1 depicts a relevant portion of a exemplary processor pipeline, constructed according to one embodiment of the present invention.

With reference to FIG. 1, a relevant portion of an exemplary processor pipeline 100 is depicted that includes a fetch pipe 102 that is coupled to an instruction store, e.g., a level 2 (L2) cache memory, 106. It should be understood that an exemplary computing system or apparatus may implement multiple processor cores, e.g., 16 cores, each having multiple processor pipelines, e.g., 4 pipelines per core, on a single integrated circuit (IC) and may include multiple of such ICs. An output of the fetch pipe 102 is provided to a fetch buffer 104, which may function to decouple the fetch pipe 102 from subsequent pipes in the pipeline 100. As is shown in FIG. 1, a helper store 110, e.g., a programmable helper random access memory (RAM), is coupled to an output of the fetch buffer 104. The helper store 110 includes microcoded instructions that provide helper instruction sequences, when appropriate, to the decode pipe 108. In general, the helper store 110 implements instructions that, for various reasons, a designer has decided not to implement directly in hardware. As is usual, the decode pipe 108 includes one or more stages that function to decode instructions. The decode pipe 108 is coupled to the instruction queue 112, which may also serve to decouple the decode pipe 108 from later stages of the pipeline 100.

A register file 114, including a working register file (WRF) and an architectural register file (ARF), is coupled to the decode pipe 108, an execution pipe 118 and a trap and commit unit 122. It should be appreciated that while the WRF and ARF are shown combined, the WRF and ARF may be, in fact, implemented as separate files for each pipeline. Alternatively, a single register file may be implemented. Instructions stored in the instruction queue 112 may be grouped, by grouping unit 116, for execution by the execution pipe 118. The execution pipe 118 is coupled to the commit unit 122, which commits executed instructions to architectural state in the ARF. A data cache 120 is coupled to the execution pipe 118 and provides data to the execution pipe 118.

Figure 2:
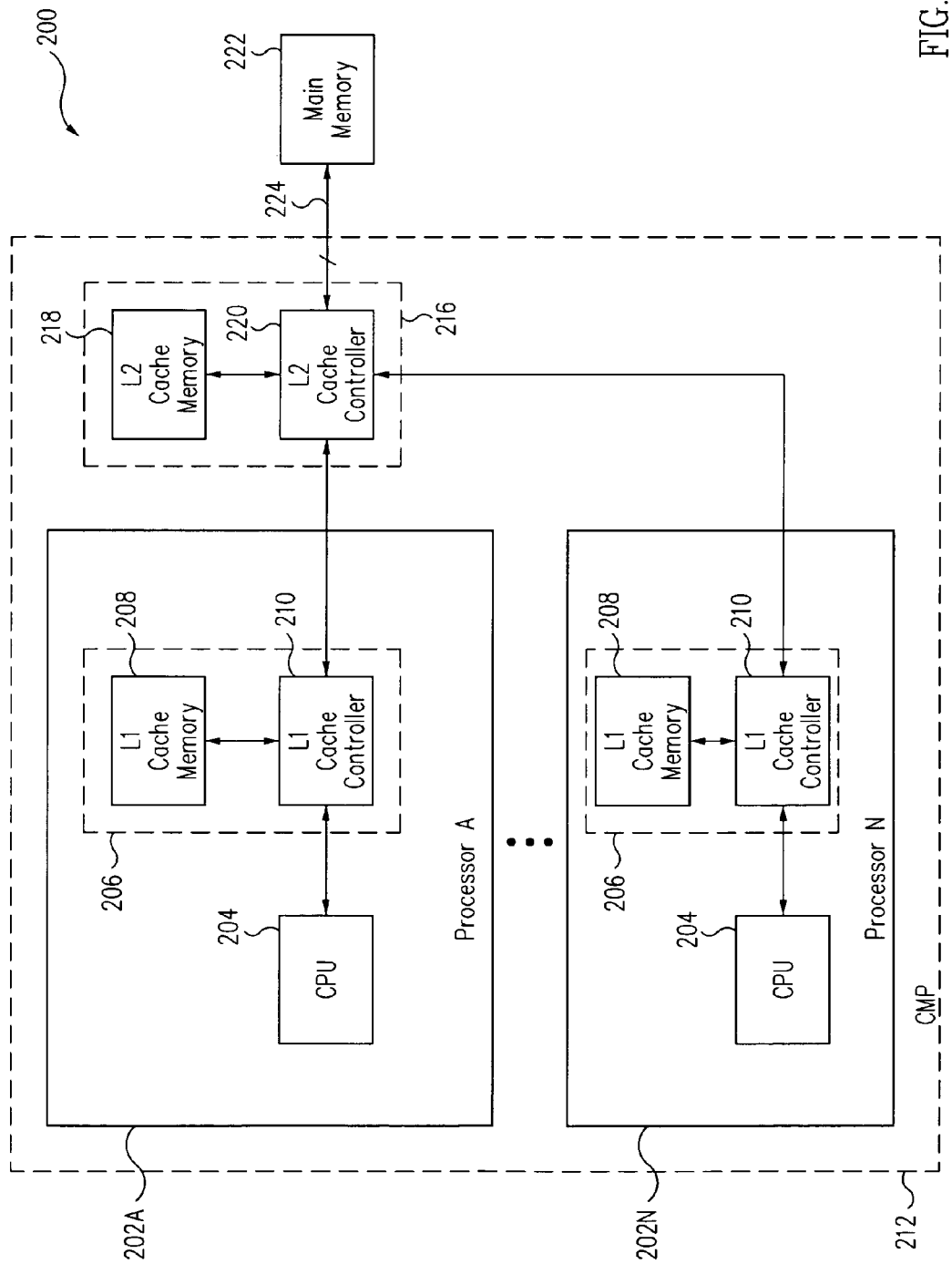
FIG. 2 depicts a block diagram of an exemplary chip multiprocessor (CMP), constructed according to an embodiment of the present invention.

With reference to FIG. 2, an exemplary chip multiprocessor (CMP) 212 is depicted that includes a plurality of processors 202A-202N. Each of the processors 202A-202N include a central processing unit (CPU) 204, an L1 cache memory 206, which includes an L1 cache memory bank 208 and an L1 cache controller 210. As is depicted, the L1 cache controllers 210 are each coupled to an L2 cache controller 220, which controls an L2 cache memory bank 218. The depiction of the memory hierarchy is exemplary and more or less than two levels of cache may be incorporated within the CMP 212. In any case, the present invention is generally applicable to reducing off-chip bandwidth requirements for a wide variety of architectures. The L2 cache controller 220 is also coupled to an off-chip memory 222, which typically is an application appropriate sized random access memory (RAM).

The system 200 is configured to read out old data in a cache line of cache memory 216 before storing new data to the cache line. This is done for the purposes of detecting ECC errors and for correctly updating the ECC to take into account the bits that have changed as the result of storing new data. According to various embodiments of the present invention, non-traditional "dirty bits" are implemented on a block basis (e.g., per cache line or per portion of a cache line) to indicate which bits have actually changed. It should be appreciated that this approach is distinct from approaches utilizing traditional "dirty bits," which merely indicate whether a store has been performed.

According to one aspect of the present invention, a block, e.g., a cache line or portion of a cache line, is only marked as dirty if the bits in a new block actually differ from the bits in an associated old block of the cache line. In this manner, when cache lines are booted from the cache, only cache lines (or portions of cache lines) that have actually been modified are written out to the main memory 222 or other off-chip memory, e.g., L3 cache. As a result, bandwidth requirements on outgoing links 224 are substantially reduced. It should be noted that from a reliability point of view it may be desirable to duplicate the non-traditional "dirty bits." Duplicating the non-traditional "dirty bits" in different storage locations allows for the detection of memory corruption due to various factors, e.g., corruption due to cosmic ray impact. Typically, a two-fold redundancy is sufficient to ensure reliability as it is safe to assume a block of a cache line is dirty in the event that the two copies disagree.

Figure 3:
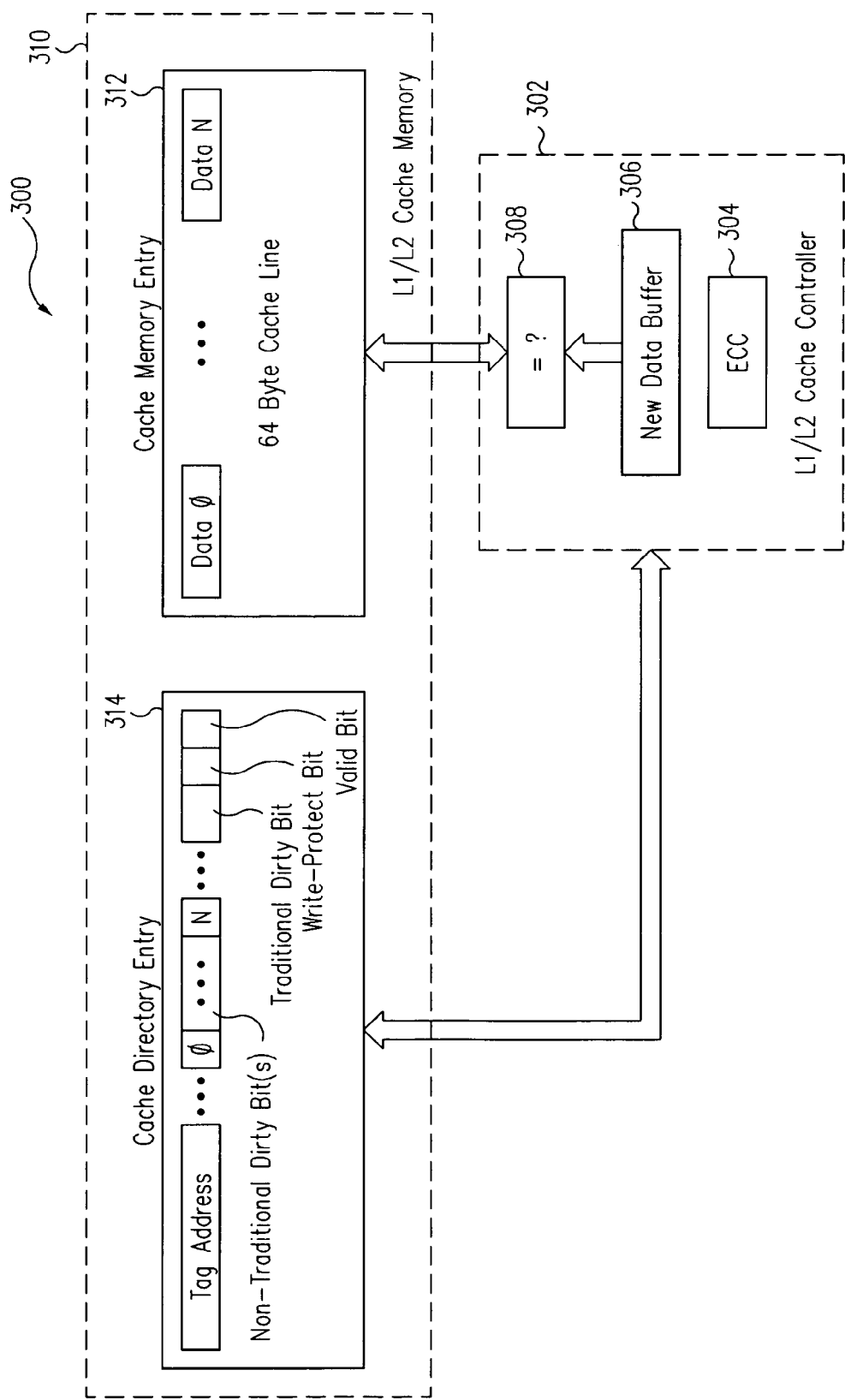
FIG. 3 depicts a block diagram of a relevant portion of an exemplary cache controller and cache memory, constructed according to one embodiment of the present invention.

With reference to the FIG. 3, a relevant portion of a cache memory 300 is depicted which includes cache memory bank 310 and cache controller 302. As previously noted, the present invention may be implemented at either an L1 or L2 cache level (or other level), depending upon how many cache levels are provided as on-chip storage. The memory 310 includes a plurality of cache directory entries 314 each of which may include a tag address, a traditional "dirty bit", a write-protect bit and a valid bit for each cache line. Each of the entries 314 corresponds to a cache memory entry 312, which may include, for example, 64 bytes per cache line. It should be appreciated that the size of entry 312 is architecture dependent. The cache controller 302 includes ECC logic 304 for correcting errors, a new data buffer 306 and comparators 308. As noted above, in preparation for a write to cache memory 310, old data is read from the cache memory 310. The controller 302 utilizes the comparators 308 to determine whether the old data read from the memory 310 is the same as the new data in the new data buffer 306 that is to be written to the cache memory 310. If so, no non-traditional "dirty bits" are asserted in the entry 314 associated with the entry 312. However, assuming that one or more blocks of the entry 312 are different than the new data in the new data buffer, appropriate non-traditional "dirty bits" are asserted in the entry 314. For example, one non-traditional "dirty bit" may be employed for each byte of entry 312. Assuming a 64-byte cache line with one non-traditional "dirty bit" per byte, allocation for 64 non-traditional "dirty bits" is provided for each entry 314.

Figure 4:
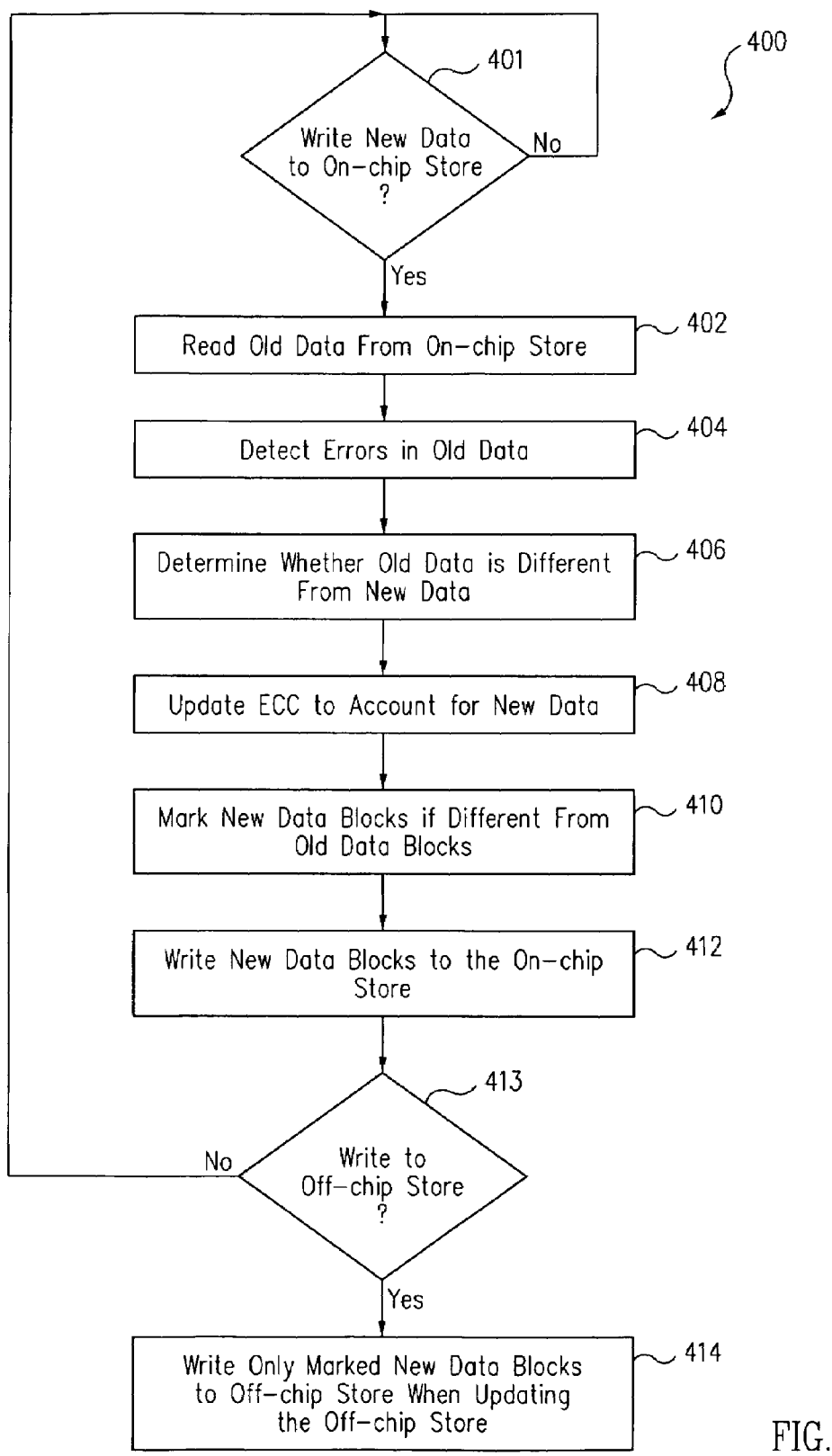
FIG. 4 is a flow chart of a process for reducing off-chip bandwidth requirements for a processor, according to an embodiment of the present invention.

With reference to FIG. 4, a process 400 is depicted which implements a technique for reducing off-chip bandwidth requirements for a processor according to one aspect of the present invention. Initially, at decision block 401, control loops on block 401 until new data is to be written to on-chip store. Control transfers, from block 401 to block 402, when new data is to be written to the on-chip store. In block 402, old data is read from a location in the on-chip store of the processor in preparation of writing new data to the location in the on-chip store. Next, at block 404, an error correction code (ECC) and an error correcting circuit are utilized for detecting errors in the old data. Next, at block 406, it is determined whether new data blocks in the new data and associated old data blocks in the old data are different. Then, in block 408, the ECC is updated to account for changed data bits attributable to the new data. Next, in block 410, new data blocks are marked with a non-traditional "dirty bit," when one or more bits in the corresponding one of the old data blocks has changed. Then, in block 412, new data blocks are written to the on-chip store. Next, in decision block 413, when an off-chip store is to be updated due to, for example, a cache line being booted, control transfers to block 414. Otherwise, control transfers from block 413 to block 401. When control transfers to block 414, only marked new data blocks of a booted cache line or lines are written to the off-chip store when updating the off-chip store. Accordingly, the present invention provides a technique for reducing off-chip bandwidth requirements for a processor. The technique is particularly advantageous in chip multi-processor (CMP) designs and/or other designs that implement aggressive speculative architectures.

The described invention may be provided as a computer program product, or software, that may include a machine-readable medium having stored thereon instructions, which may be used to program a computer system (or other electronic devices) to perform a process according to the present invention. A machine readable medium may include any mechanism for storing information in a tangible form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM) ; random access memory (RAM); erasable programmable memory (e.g., EPROM and EEPROM); flash memory; or other types of medium suitable for storing electronic instructions.

Figure 5:
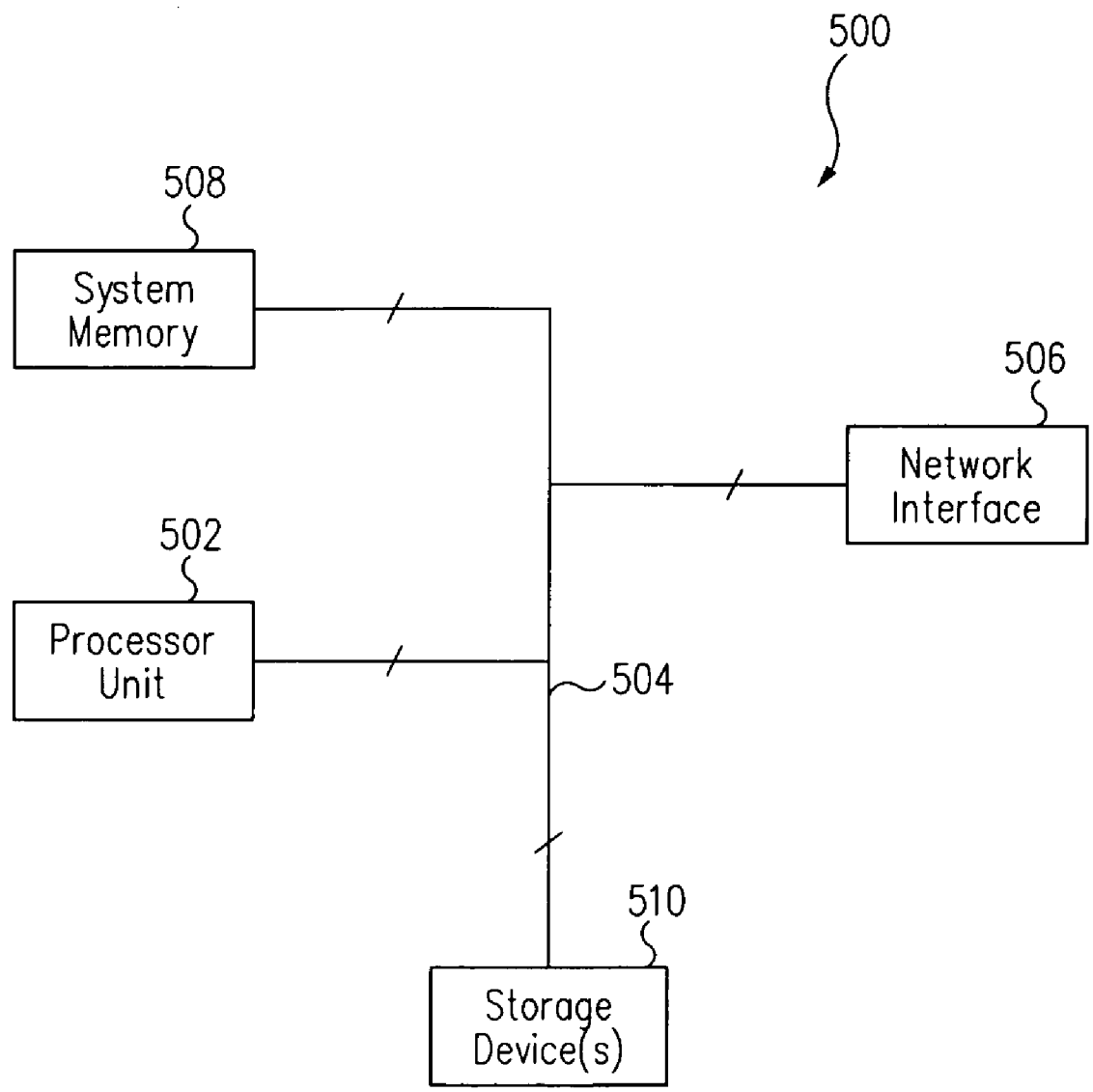
FIG. 5 depicts an electrical block diagram of an exemplary computer system, constructed according to an embodiment of the present invention.

FIG. 5 depicts an exemplary computer system 500, constructed according to various aspects of the present invention. The computer system 500 includes a processor 502, which may include multiple processors, a single threaded processor, a multi-threaded processor, a multi-core processor, etc., that implements one or more of the pipelines 100. The computer system 500 also includes a system memory 508 (e.g., one or more cache levels, SRAM, DRAM, RDRAM, EDO RAM, DDR RAM, and/or EEPROM, etc.), a system bus 504 (e.g., LDT, PCI, ISA, etc.), a network interface 506 (e.g., an ATM interface, an Ethernet interface, a Frame Relay interface, etc.), and storage device(s) 510 (e.g., optical storage, magnetic storage, etc.). Computer system realizations of the invention may include fewer or additional components not illustrated in FIG. 5. For example, the system 500 may also include a video card, an audio card, additional network interfaces, peripheral devices, etc. The processor 502, the storage device(s) 510, the network interface 506 and the system memory 508 are coupled to the system bus 504, which includes a plurality of address, data and control lines. The processor 502 includes the instruction store 106 and a memory interface that couples the instruction store 106 to a memory hierarchy, i.e., the system memory 508.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. As used herein, plural instances may be provided for components described herein as a single instance. These and other variations, modifications, additions, and improvements may fall within the scope of the invention as defined in the claims that follow.

What is claimed is:

1. A method for reducing off-chip bandwidth requirements for a processor, comprising:
    maintaining a dirty bit for a line of an on-chip cache;
    storing new data in an on-chip new data buffer;
    reading old data from a location in the line of the on-chip cache of said processor in preparation of writing new data from the on-chip new data buffer to the location in the line of the on-chip cache;
    determining whether new data bytes in the new data and associated old data bytes in the old data are different;
    writing the new data bytes to the line of the on-chip cache;
    marking each new data byte in the new data, which is different from the associated old data byte, to identify said each new data byte wherein said marking is in addition to maintaining the dirty bit for the line of the on-chip cache; and
    writing only the marked new data bytes to an off-chip store when updating the off-chip store.

2. The method of claim 1, wherein the reading old data from a location in an on-chip store of a processor, further comprises: detecting errors in the old data with an error correcting circuit/code (ECC); and updating the ECC to account for changed data bits attributable to the new data.

3. The method of claim 1, wherein the on-chip cache one of a level 1 (L1) cache memory or a level 2 (L2) cache memory.

4. The method of claim 1, wherein the cache memory line is 64-bytes in length.

5. The method of claim 1, further comprising;
duplicating said marking in a different storage location for allowing detection of memory corruption.

6. The method of claim 1, wherein the method is encoded in computer readable instructions encoded on one or more computer readable storage media.

7. A processor, comprising:
a plurality of central processing units (CPUs);
a cache memory coupled to the CPUs; and
a cache controller coupled to the cache memory,
wherein the cache controller is configured to:
maintain a dirty bit for a line of the cache memory;
store new data in an on-chip new data buffer;
read old data from a location in the line of the cache memory in preparation of writing new data from the on-chip new data buffer to the location in the line of the cache memory;
determine whether new data bytes in the new data and associated old data bytes in the old data are different;
write the new data bytes to the location in the line of the cache memory;
mark each new data byte in the new data, which is different from the associated old data byte, to identify said each new data byte wherein said marking is in addition to any marking of the dirty bit for the line of the cache memory; and
write only the marked new data bytes to an off-chip store when updating the off-chip store.

8. The processor of claim 7, further comprising:
an error correcting circuit/code (ECC) for detecting errors in the old data, wherein the ECC is updated to account for changed data bits attributable to the new data.

9. The processor of claim 7, wherein the cache memory is a level 1 (L1) cache memory or a level 2 (L2) cache memory.

10. The processor of claim 7, wherein the cache memory line is 64-bytes in length.

11. The processor of claim 7, wherein the cache controller is further configured to duplicate said marking in a different storage location for allowing detection of memory corruption.

12. The processor of claim 7, wherein the processor is a chip multiprocessor (CMP) and the CMP includes a plurality of CPUs.

13. An apparatus for reducing off-chip bandwidth requirements for a processor, comprising:
a cache controller on said processor including:
means, on said cache controller, for maintaining a dirty bit for a line of an on-chip cache;
means, on said cache controller, for storing new data in an on-chip new data buffer;
means, on said cache controller, for reading old data from a location in the line of the on-chip cache of said processor in preparation of writing new data from the on-chip new data buffer to the location in the line of the on-chip cache;
means, on said cache controller, for determining whether new data bytes in the new data and associated old data bytes in the old data are different;
means, on said cache controller, for writing the new data bytes to the line of the on-chip cache;
means, on said cache controller, for marking each new data byte in the new data, which is different from the associated old data byte, to identify said each new data byte wherein said marking is in addition to any marking of the dirty bit for the line of the on-chip cache; and
means, on said cache controller, for writing only the marked new data bytes to an off-chip store when updating the off-chip store.

14. The apparatus of claim 13, further comprising:
means, on said cache controller, for detecting errors in the old data with an error correcting code (ECC); and
means, on said cache controller, for updating the ECC to account for changed data bits attributable to the new data.

\* \* \* \* \*

UNITED STATES PATENT AND TRADEMARK OFFICE
CERTIFICATE OF CORRECTION

PATENT NO. : 7,478,203 B2  
APPLICATION NO. : 11/371144  
DATED : January 13, 2009  
INVENTOR(S) : Paul Caprioli and Shailender Chaudhry Page 1 of 1

It is certified that error appears in the above-identified patent and that said Letters Patent is hereby corrected as shown below:

In Column 6, Lines 65-66, Claim 2, replace "correcting circuit/code" with --correction code-;
In Column 7, Line 1, Claim 3, between "on-chip cache" and "one of", insert --is-;
In Column 7, Line 34, Claim 8, replace "correcting circuit/code" with --correction code-;
In Column 8, Line 6, Claim 12, between "includes" and "plurality", replace "a" with --said--;
In Column 8, Line 35, Claim 14, replace "correcting" with --correction--.

Signed and Sealed this

Twenty-fourth Day of March, 2009

JOHN DOLL  
*Acting Director of the United States Patent and Trademark Office*